United States Patent [19]

Jonsson et al.

[11] Patent Number: 4,757,881
[45] Date of Patent: Jul. 19, 1988

[54] MOTOR SAW BRAKE

[75] Inventors: Lars O. Jonsson, Göteborg; Hans I. Ström, Kode; Lars P. Skoglund, Göteborg, all of Sweden

[73] Assignee: Aktiebolaget Electrolux, Sweden

[21] Appl. No.: 859,350

[22] Filed: May 5, 1986

[30] Foreign Application Priority Data

May 31, 1985 [SE] Sweden ............................ 8502688

[51] Int. Cl.⁴ .............................................. B23D 57/02
[52] U.S. Cl. ................................... 188/77 R; 188/171; 30/382
[58] Field of Search ...................... 188/171, 77 R, 137; 30/381, 382

[56] References Cited

U.S. PATENT DOCUMENTS

| | | | |
|---|---|---|---|
| 837,854 | 12/1906 | Larson | 188/171 |
| 2,513,192 | 6/1950 | McFarland | 188/77 R |
| 3,991,469 | 11/1976 | Frederickson | 188/77 R X |
| 4,573,556 | 3/1986 | Andreasson | 30/382 |
| 4,586,588 | 5/1986 | Nagashima et al. | 188/77 R |
| 4,635,364 | 1/1987 | Noll et al. | 188/77 R X |
| 4,653,189 | 3/1987 | Andreasson | 30/382 |

Primary Examiner—Joseph Falk
Attorney, Agent, or Firm—Alfred E. Miller

[57] ABSTRACT

A chain brake which is manually adjustable into a cocked position and releasable by means of stored electric energy and a trigger, includes a permanent magnet circuit in which a movable armature is a part of a latch which keeps the brake in the cocked position. The permanent magnet has a coil exerting a counter directional magnetic field to the permanent magnet when it passes current. The holding force on the latch decreases and the brake is released when current from a capacitor passes through the coil.

6 Claims, 1 Drawing Sheet

MOTOR SAW BRAKE

FIELD OF THE INVENTION

The present invention relates to an arrangement for triggering a chain brake of a motor saw which during operation with, for instance, debranching, has a tendency to generate a kick-back by which the saw is thrown against the operator.

DESCRIPTION OF THE PRIOR ART

It is known to provide a chain brake in motor saws with an accompanying triggering mechanism so that the saw chain is stopped at an early stage of such a kick-back. U.S. Pat. No. 4,653,189 discloses making a chain brake releasable by means of an electrically controlled release mechanism in which a charging circuit with a capacitor and a first switch are connected in series to the ignition generator of the saw, and a discharging circuit for the capacitor and a second switch are connected to an electromagnet which disengages a latch in the triggering mechanism.

To make sure that such a control circuit of the brake will be used in the best possible way it is required that the triggering mechanism controlled by the latch has the least possible inertia, i.e. it has a fast and safe reaction on the current pulse of the control circuit.

SUMMARY OF THE INVENTION

The present invention is directed to an arrangement of a triggering mechanism which provides a superior reaction and therewith associated short braking time periods. In contrast to previously known electromagnetic trigger devices the arrangement has a permanent magnet circuit in which a coil exerts a counter-magnetism when it is energized and thus eliminates a permanent magnetic force which creates the holding force on a latch included in the mechanism. As a consequence of the decrease of the holding force on the latch the brake will switch on when the coil is connected to the control circuit.

BRIEF FIGURE DESCRIPTION

An embodiment of the invention will now be described with reference to the attached drawing which shows in FIG. 1 a vertical projection of a motor saw brake according to the invention, in FIG. 2 a wiring diagram of the brake.

DESCRIPTION OF PREFERRED EMBODIMENTS

Figure 1:
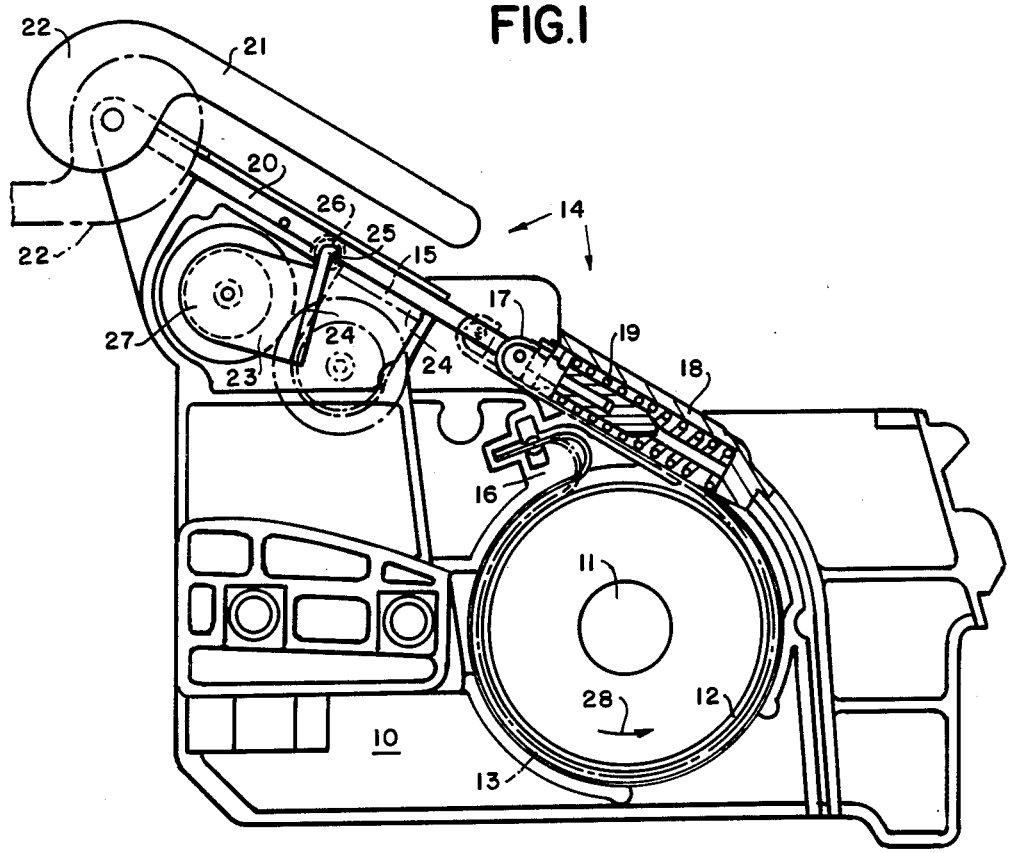

The brake mechanism is positioned in a cover 10 of the motor saw housing, and FIG. 1 shows the inside of this cover. An engine shaft 11 and a clutch drum 12 on the shaft are schematically shown as circles in the position they have when the cover is mounted to the saw body. The brake comprises mainly a brake band 13, a cocking device 14 and a trigger 15. The brake band is fastened at one end to the cover by a locking member 16 and the other end to a guide 17 moveable in a cylinder 18. The cocking device comprises a helical spring 19 in said cylinder, a bar 20 carrying the guide, and a handle 21 with an eccentric 22 which displaces the bar against the spring 19 by a swinging motion. The trigger is special in order to attain a fast and safe triggering of the brake. It is constituted of a ring-shaped permanent magnet 23 with angularly extending poles secured in the cover and an armature in the form of a pivotable rod 24 pivoted on a shaft 25, one end of the rod is somewhat tapered and projects into a recess 26 in the bar 20, when the rod is pulled to the magnet. The magnetic force is sufficient to resist the spring force on the bar, so the spring remains in the cocked position (as shown). The brake band is then loosely positioned around the drum 12 which therefore can rotate freely.

An electromagnetic coil 27 is also positioned on the magnet eliminating the magnetic field when energized, whereby the armature can get free and rotate around the shaft 25. The spring 19 will then immediately push the bar 20 and therewith also the guide 17 in the direction to the eccentric 22, thus tensioning the brake band around the drum which then is stopped, as illustrated in dashed lines in FIG. 1. The braking force is increased by a servo action created when the brake band is tensioned in the same direction as the drum rotates (arrow 28).

The brake is reset to a free-wheel position by means of the handle 21 which is swung anti-clockwise (FIG. 1) so that the eccentric 22 presses the bar against the spring until the tip of the rod snaps into the recess 26. The rod will then again be in contact with the poles of the magnet (with the help of a spring if desired) and the poles exert the necessary holding force to keep the spring 19 tensioned. The handle can then be reset to the illustrated position, whereafter the brake is ready again for release.

Figure 2:
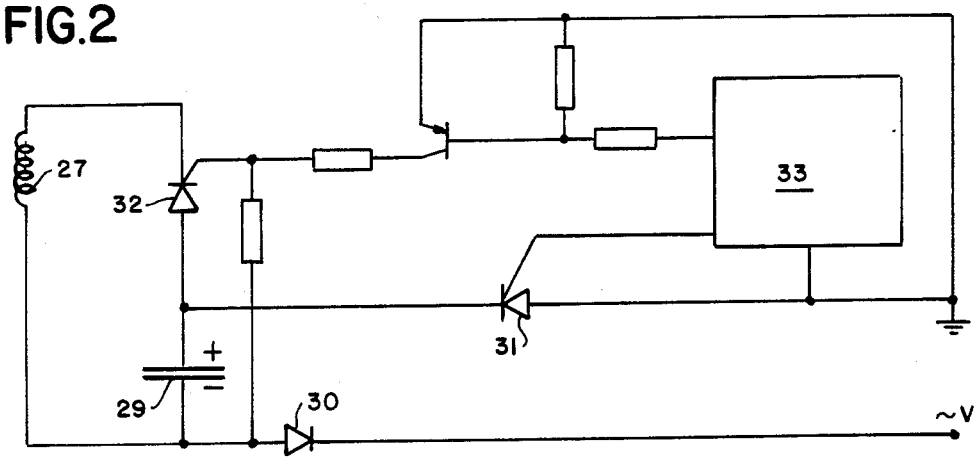

The generation of a current pulse for the coil 27 is here assumed to be carried out by a circuit according to FIG. 2. A capacitor 29 is connected in series with a diode 30 and a switch 31 to a current source in a motor saw, e.g. the primary winding of the ignition coil. The capacitor is also connected in a circuit with a second switch 32 and the coil 27. The switches are controlled by signals from a microprocessor 33. Since the function of this circuit and the circuits to the two switches are completely described in the previously mentioned U.S. Pat. No. 4,653,189, there is no detailed description given for this matter here.

We claim:
1. In a brake for a motor saw, wherein the brake includes a braking element, a cocking mechanism for controlling the braking element, and a trigger mechanism for triggering the cocking mechanism to thereby control the braking element to selectively stop or permit operation of the saw, wherein said cocking mechanism comprises an operating element and means for biasing said operating element to a first position at which it controls said braking element to stop said saw, and said trigger mechanism comprises holding means for releasably holding said operating element at a second position at which it controls said braking element to enable operation of said saw, a control circuit for producing a triggering signal, and an electromagnet responsive to said triggering signal for controlling said holding means to release said operating element from said second position; the improvement wherein said holding means comprises latching means for latching said operating element at said second position, said latching means comprising an armature of a magnetic material, and a permanent magnet mounted to said holding means at a position of said holding means at which said permanent magnet attracts said armature toward the position of said armature at which said armature latches said operating element at said second position thereof, said electromagnet being positioned to produce a magnetic field opposing the field of said permanent magnet in response to said triggering signal, thereby to release said armature from the attractive force of said permanent magnet and permit said armature to release said operating element to move to said first position under the force of said biasing means.

2. The brake of claim 1 wherein said armature comprises a pivotally mounted member having a first end pivotable to a position against said permanent magnet and a second end engagable with said operating element to inhibit movement of said operating element from said second position.

3. The brake of claim 1 wherein said operating element comprises an elongated element having a notch for receiving said armature in said second position, said armature being pivotally mounted to engage said notch in said second positon and to be free of said notch in said first position.

4. The brake of claim 1 wherein said electromagnet comprises a coil wound on said permanent magnet.

5. The brake of claim 1 wherein said cocking mechanism further comprises a cocking lever having a cam surface for engaging said operating element to enable setting of said operating element to said second position.

6. The brake of claim 5 wherein said cocking lever comprises a motor saw stirrup.

* * * * *